Patented Apr. 25, 1939

2,155,406

UNITED STATES PATENT OFFICE 2,155,406

ELECTRICAL CONDUCTOR

Donald K. Crampton, Marion, and Henry L. Burghoff, Waterbury, Conn., assignors to Chase Brass & Copper Co. Incorporated, Waterbury, Conn., a corporation No Drawing. Application April 28, 1938,
Serial No. 204,913

9 Claims. (Cl. 173—13)

This invention relates to improvements in electrical conductors formed of copper-base alloys.

It is an object of this invention to produce electrical conductors formed of copper-base alloys and having a combination of high electrical conductivity and high tensile strength.

We have found that various forms of electrical conductors, such, for example, as conductor-wires of various types, welding electrode tips, electrical connections, etc., when formed of the copper-base alloys hereinafter set forth, and heat-treated and cold-worked, possess a combination of high electrical conductivity and high tensile strength.

The expression, combination of high electrical conductivity and high tensile strength, does not necessarily mean that each is particularly high, considered alone, but that the combination of these properties is attractive or high from a practical standpoint. In other words, the conductivity is high for a given tensile strength, or vice versa.

We have found that electrical conductors can be given a combination of high electrical conductivity and high tensile strength when made of copper-base alloys containing by weight, iron from about 0.3% to about 3%, phosphorus from about 0.1% to about 0.6%, the ratio by weight of the iron to phosphorus being from about 2.5 to 1 to about 5.5 to 1 and preferably being about 3.6 to 1, metal selected from a group consisting of tin and zinc, the tin not exceeding about 1.5% and the zinc not exceeding about 10%, the total per cent of tin and/or zinc being such that the $$\frac{\%\ \text{tin}}{1.5} \text{ plus } \frac{\%\ \text{zinc}}{10}$$

is from about 0.05 to about 1, and copper, the copper, iron, phosphorus, tin and/or zinc constituting about 93% or more of the alloy, with or without one or more additional elements in such substantially innocuous amounts as do not seriously impair the desired properties of the alloy. When tin is present it ranges from about 0.2% to about 1.5%, the zinc ranging from about zero to about 10%. When no tin is present, the lowest amount of the zinc is about 0.5%.

The additional elements may range up to a total of about 7%, depending on what elements are added, some being more innocuous than others. Thus, while each of the elements aluminum, silicon and manganese should not be present much in excess of about 0.1%, and chromium should not be present much in excess of about 0.2%, silver, which is comparatively innocuous, may be present to as high as about 5%. Other elements may also be present. Thus, for example, elements which improve the machinability with very little effect on conductivity and strength may be added, such as lead about 2%, tellurium about 1.5%, selenium about 1.5%, sulphur about 1%. In the absence of silver, the total of all the said additional elements may be as high as about 2½%. With silver, the total may be as high as about 7%.

A more preferred range for the alloy is for the iron to be from about 0.5%, to about 2% and the phosphorus from about 0.15% to about 0.5%, with the ratio of iron to phosphorus the same as given for the first-stated alloy, the facts concerning tin and/or zinc and additional elements being the same as in the case of the first-stated alloy range.

A still more preferred range for the alloy is for the iron to be from about 0.7% to about 1.5% and the phosphorus from about 0.2% to about 0.4%, with the ratio of iron to phosphorus the same as given for the first-stated alloy, the facts concerning tin, zinc and additional elements being the same as in the case of the first-stated alloy range, except as follows. With regard to the metal selected from a group consisting of tin and zinc, while tin does not exceed about 1.5% the zinc does not exceed about 6%, the total per cent of tin and/or zinc being such that the $$\frac{\%\ \text{tin}}{1.5} \text{ plus } \frac{\%\ \text{zinc}}{6}$$

is from about 0.13 to about 1. When tin is present it ranges from about 0.2% to about 1.5%, the zinc ranging from about zero to about 6%. When no tin is present, the lowest amount of the zinc is about 1%.

Three preferred conductors may be advantageously made from specific alloys having nominal or approximate composition as follows: all three have about 0.9% iron and about 0.25% phosphorus; the first alloy having about 0.5% tin, about 5% zinc, and the balance substantially of copper, when made in the form of a wire and finished by suitable annealing at about 1000° F., and given a final reduction by cold-drawing of eight B. & S. numbers hard (reduction of area of 84%), has an electrical conductivity of 42% I. A. C. S. and a tensile strength of 92,000 lbs. per square inch; the second alloy having about 1% tin and no zinc, and the balance substantially of copper, when similarly heat-treated and cold-drawn, has an electrical conductivity of 46% I. A. C. S. and a tensile strength of 90,000 lbs. per square inch; and the third alloy having about 5% zinc and no tin, and the balance substantially of copper, when similarly heat-treated and cold-drawn, has an electrical conductivity of 47% I. A. C. S. and a tensile strength of 84,000 lbs. per square inch.

In order to secure the desired high tensile strength in conductors made of alloys contemplated in accordance with the present invention, it is necessary that the alloy shall be heat-treated and cold-worked in producing a conductor. The heat-treatment markedly increases the electrical conductivity without giving much increase in tensile strength, and the cold-working markedly increases the tensile strength while only slightly decreasing the electrical conductivity.

The heat-treatment may consist of heating or annealing the alloy at a temperature in the range from 1250° F. to 1550° F. and quenching followed by reheating or annealing at a temperature in the range from 600° F. to 1100° F. It is possible to eliminate the high temperature treatment as such entirely, high conductivity being developed merely by a lower temperature annealing treatment, preferably at 1000° F. Thus, the alloys may be produced by casting, hot-working, and annealing at 1000° F. to obtain high conductivity, and finally cold-working to obtain the desired strength. It has also been found that the time required for obtaining high conductivity is much less if the material is first cold-worked than if heated at 1000° F. in the hot-worked condition.

After the heat-treatment is completed, the alloy is cold-worked to bring the conductor to its final size and shape and give it the desired high tensile strength. Thus, where the conductor is in the form of a wire, the wire is hard-drawn some amount, ordinarily between about four and fourteen number B. & S. hard, although a lower or higher amount of cold-drawing may be used.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

We claim:

1. An electrical conductor characterized by a combination of high electrical conductivity and high tensile strength, and formed of a copper-base alloy heat-treated and cold-worked and containing: iron from about 0.3% to about 3%; phosphorus from about 0.1% to about 0.6% and the ratio of iron to phosphorus being from about 2.5 to 1 to about 5.5 to 1; metal selected from a group consisting of tin and zinc, the tin not exceeding about 1.5% and the zinc not exceeding about 10%, the total per cent of tin and/or zinc being such that the $$\frac{\% \text{ tin}}{1.5} \text{ plus } \frac{\% \text{ zinc}}{10}$$

is from about 0.05 to about 1; and the combination of high electrical conductivity and high tensile strength being due primarily to the combined effect of the iron, phosphorus, tin and/or zinc, heat-treatment and cold-working.

2. An electrical conductor characterized by a combination of high electrical conductivity and high tensile strength, and formed of a copper-base alloy heat-treated and cold-worked and containing: iron from about 0.3% to about 3%; phosphorus from about 0.1% to about 0.6% and the ratio of iron to phosphorus being from about 2.5 to 1 to about 5.5 to 1; tin from about 0.2% to about 1.5%; and the combination of high electrical conductivity and high tensile strength being due primarily to the combined effect of the iron, phosphorus, zinc, heat-treatment and cold-working.

3. An electrical conductor characterized by a combination of high electrical conductivity and high tensile strength, and formed of a copper-base alloy heat-treated and cold-worked and containing: iron from about 0.3% to about 3%; phosphorus from about 0.1% to about 0.6% and the ratio of iron to phosphorus being from about 2.5 to 1 to about 5.5 to 1; zinc from about 0.5% to about 10%; and the combination of high electrical conductivity and high tensile strength being due primarily to the combined effect of the iron, phosphorus, zinc, heat-treatment and cold-working.

4. An electrical conductor characterized by a combination of high electrical conductivity and high tensile strength, and formed of a copper-base alloy heat-treated and cold-worked and containing: iron from about 0.5% to about 2%; phosphorus from about 0.15% to about 0.5% and the ratio of iron to phosphorus being from about 2.5 to 1 to about 5.5 to 1; metal selected from a group consisting of tin and zinc, the tin not exceeding about 1.5 and the zinc not exceeding about 10%, the total per cent of tin and/or zinc being such that the $$\frac{\% \text{ tin}}{1.5} \text{ plus } \frac{\% \text{ zinc}}{10}$$

is from about 0.05 to about 1; and the combination of high electrical conductivity and high tensile strength being due primarily to the combined effect of the iron, phosphorus, tin and/or zinc, heat-treatment and cold-working.

5. An electrical conductor characterized by a combination of high electrical conductivity and high tensile strength, and formed of a copper-base alloy heat-treated and cold-worked and containing: iron from about 0.5% to about 2%; phosphorus from about 0.15% to about 0.5% and the ratio of iron to phosphorus being from about 2.5 to 1 to about 5.5 to 1; tin from about 0.2% to about 1.5%; and the combination of high electrical conductivity and high tensile strength being due primarily to the combined effect of the iron, phosphorus, tin, heat-treatment and cold-working.

6. An electrical conductor characterized by a combination of high electrical conductivity and high tensile strength, and formed of a copper-base alloy heat-treated and cold-worked and containing: iron from about 0.5% to about 2%; phosphorus from about 0.15% to about 0.5% and the ratio of iron to phosphorus being from about 2.5 to 1 to about 5.5 to 1; zinc from about 0.5% to about 10%; and the combination of high electrical conductivity and high tensile strength being due primarily to the combined effect of the iron, phosphorus, zinc, heat-treatment and cold-working.

7. An electrical conductor characterized by a combination of high electrical conductivity and high tensile strength, and formed of a copper-base alloy heat-treated and cold-worked and containing: iron about 0.9%; phosphorus about 0.25%; tin about 0.5% and zinc about 5%; and the combination of high electrical conductivity and high tensile strength being due primarily to the combined effect of the iron, phosphorus, tin, zinc, heat-treatment and cold-working.

8. An electrical conductor characterized by a combination of high electrical conductivity and high tensile strength, and formed of a copper-base alloy heat-treated and cold-worked and containing: iron about 0.9%; phosphorus about 0.25%; tin about 1%; and the combination of high electrical conductivity and high tensile strength being due primarily to the combined effect of the iron, phosphorus, tin, heat-treatment and cold-working.

9. An electrical conductor characterized by a combination of high electrical conductivity and high tensile strength, and formed of a copper-base alloy heat-treated and cold-worked and containing: iron about 0.9%; phosphorus about 0.25%; zinc about 5%; and the combination of high electrical conductivity and high tensile strength being due primarily to the combined effect of the iron, phosphorus, zinc, heat-treatment and cold-working.

DONALD K. CRAMPTON.
HENRY L. BURGHOFF.